(12) United States Patent
Roque

(10) Patent No.: US 7,522,056 B2
(45) Date of Patent: Apr. 21, 2009

(54) BADGE VERIFICATION DEVICE

(75) Inventor: Peter A. Roque, Mansfield, MA (US)

(73) Assignee: V.H. Blackinton & Co., Inc., Attleboro, MA (US)

( * ) Notice: Subject to any disclaimer, the term of this patent is extended or adjusted under 35 U.S.C. 154(b) by 42 days.

(21) Appl. No.: 11/440,277

(22) Filed: May 24, 2006

(65) Prior Publication Data

US 2006/0267773 A1 Nov. 30, 2006

Related U.S. Application Data

(60) Provisional application No. 60/683,855, filed on May 24, 2005.

(51) Int. Cl.
*G08B 13/14* (2006.01)
(52) U.S. Cl. .................... 340/572.7; 343/723; 343/872
(58) Field of Classification Search ............... 340/572.7
See application file for complete search history.

(56) References Cited

U.S. PATENT DOCUMENTS

| | | | |
|---|---|---|---|
| 5,050,323 A * | 9/1991 | Gagnon | 40/1.5 |
| 5,979,941 A | 11/1999 | Mosher, Jr. et al. | |
| 6,809,646 B1 | 10/2004 | Lee | |
| 6,816,075 B2 | 11/2004 | Grunes et al. | |
| 6,817,530 B2 | 11/2004 | Labrec et al. | |
| 6,843,422 B2 | 1/2005 | Jones et al. | |
| 6,856,238 B2 | 2/2005 | Wootton et al. | |
| 6,933,849 B2 | 8/2005 | Sawyer | |
| 7,315,248 B2 * | 1/2008 | Egbert | 340/572.7 |
| 2006/0097057 A1 * | 5/2006 | Porad | 235/492 |
| 2006/0208857 A1 * | 9/2006 | Wong | 340/5.82 |

FOREIGN PATENT DOCUMENTS

| | | |
|---|---|---|
| EP | 0463871 | 1/1992 |
| EP | 1406209 | 4/2004 |
| WO | WO 2005010843 | 2/2005 |

OTHER PUBLICATIONS

International Search Report PCT/US2006/020026, dated Sep. 25, 2006.

* cited by examiner

*Primary Examiner*—Benjamin C Lee
*Assistant Examiner*—Ojiako Nwugo
(74) *Attorney, Agent, or Firm*—Wolf, Greenfield & Sacks, P.C.

(57) ABSTRACT

A badge, such as that used by police officers and other law enforcement officials, includes a badge body constructed and arranged to support one or more components of the badge, such as an officer's badge number, indicia indicating the organization with which the officer is affiliated, a pin or other arrangement by which to secure the badge to an object, and so on. The badge body may be made of metal, and an RFID device may be attached to the badge body. The RFID device may include a coil antenna and a processor in communication with the coil antenna arranged to function as an RFID transponder. At least one antenna-enhancing structure may be attached to the badge body and be adjacent the coil antenna so as to enhance an ability of the RFID device to communicate wirelessly with an RFID reader.

16 Claims, 2 Drawing Sheets

BADGE VERIFICATION DEVICE

This application claims the benefit of U.S. Provisional application No. 60/683,855, filed May 24, 2005.

BACKGROUND

1. Field of Invention

This invention relates to badge verification, e.g., using an RFID device that is attached to the badge.

2. Related Art

Badges are commonly used by police officers, government investigators, security personnel, and others. Typically, such badges are formed of a metal, e.g., an alloy, or of combination of metal and other suitable material. Such badges may include an identifier such as an officer's badge number that is visible to the wearer and/or others viewing the badge.

SUMMARY OF INVENTION

The inventor has appreciated that it may be desirable to have the ability to electronically verify the authenticity of one or more badges and/or the identity of a authorized person carrying the badge. Moreover, it may be desirable to have the ability to use the badge to electronically control access of the badge carrier to one or more portions of a building or other space. For example, the badge may be used as a kind of electronic pass to gain entry to secured rooms or spaces, such as a courtroom entrance, an evidence locker, a police vehicle, locker room, or other space. It may also be desirable to track the location of a person carrying the badge and/or otherwise verify the location of the person at specific times or other events. For example, the badge may allow a suitable tracking system to detect the badge's presence (and presumably also the badge carrier) at a doorway upon entering a room, in a vehicle, at a desk, at a crime scene, and so on. Accordingly, the badge may enable police or other management to confirm the location of officers at certain points during the day and/or to control access to certain rooms and spaces as desired.

In one aspect of the invention, a badge may include an RFID device secured to the badge body. The badge body may (or may not) be made of a metal, e.g., a cast, die-struck, stamped or otherwise formed structure. The RFID device may be secured in a cavity provided on the body, and a tamper-evident material, such as a sticker, epoxy sealant, or other arrangement may be provided to reveal an attempt to remove or otherwise alter the RFID device. The RFID device may be a passive device and may include a circular coil antenna/power receiver and an antenna-enhancing structure. This arrangement has been found to be particularly suited for use with badges that are formed entirely, or at least in substantial part, by a metal. That is, the close presence of a relatively large metal body can cause problems for an RFID device when communicating. The antenna-enhancing structure and its arrangement may overcome these problems and enable an associated RFID device to communicate as desired with an RFID reader. In one embodiment, the antenna-enhancing structure may include rectangular sections of a metal foil positioned on opposite sides of the RFID device. The foil sections may overlap to some degree, but not be in electrical communication with the coil antenna.

The badge may be worn or otherwise carried by members of a group, such as a group of police officers. A suitable security system may include one or more RFID readers that communicate with the RFID devices on the badges at one or more locations, e.g., at specified doorways of a building, in vehicles, etc. Thus, when a badge is present at an RFID reader, the reader may communicate with the RFID device attached to the badge and receive an identifier from the RFID device, such as a unique number. The security system may include a database that stores information regarding the identifiers of badges, and thus use the identifier to correlate against other information, such as the badge carrier's name, photograph, fingerprint or other biometric information, and so on. By knowing the location of the RFID reader, the system can determine the presence of a badge and its wearer at each location where an RFID reader is located.

These and other aspects of the invention will be apparent from the following description and claims.

BRIEF DESCRIPTION OF THE DRAWINGS

Aspects of the invention are described below with reference to the following drawings in which like numerals reference like elements, and wherein.

DETAILED DESCRIPTION

Illustrative embodiments of a badge including an RFID device are described below. However, aspects of the invention are not limited to the illustrative embodiments described, but rather may be incorporated, whether alone or in combination, with other aspects of the invention, in any suitable arrangement.

Figure 1:
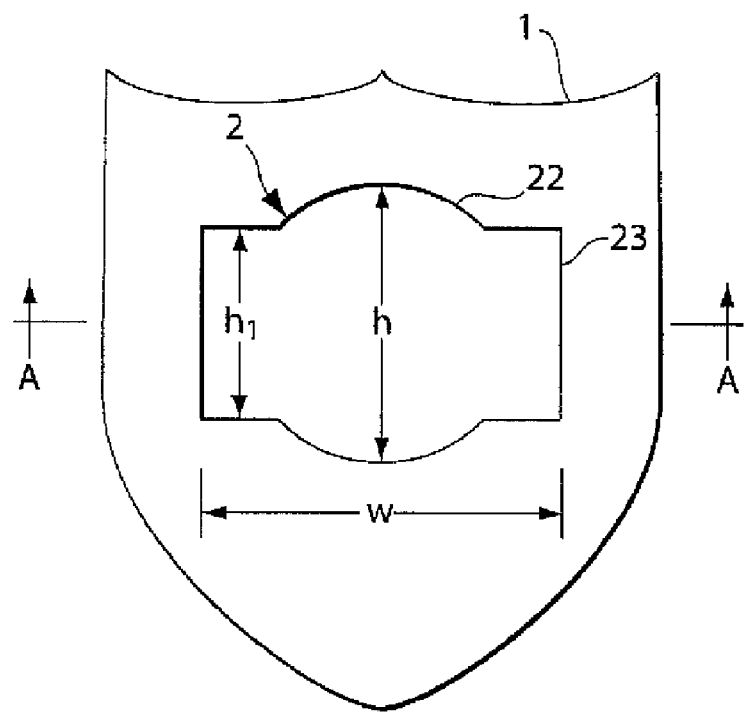
FIG. 1 shows a rear view of a badge in accordance with an aspect of the invention.

FIG. 1 shows a rear view of a badge arranged in accordance with aspects of the invention. As is well known in the art, badges of the type used by police officers, other law enforcement personnel, government investigative services, security guards, and so on, may be made in several different ways, have different shapes, sizes, etc. In general, such badges are substantially, if not entirely, made to include a metal base portion that supports other components of the badge. For example, badges may have a "shell back" configuration in which a metal shell supports the badge front and other portions. Other badges may have a "solid back" configuration in which the badge is essentially formed as a solid piece. The shell and solid back portions of the badge may be formed using any suitable process, such as die stamping, casting, etc., and may be made of any suitable material, such as metal (which includes single element materials like aluminum, silver, or gold, alloys like brass, and so on). Badge fronts may be made in any suitable way, and include graphics, lettering, artistic designs, and other aesthetic elements created in any suitable way. The badge may also include a pin or other arrangement to allow the badge to be fastened to a shirt, wallet or other object. Further description of other badge components is not provided as these features of a badge are not critical to aspects of the invention and are well understood in the art.

Figure 2:
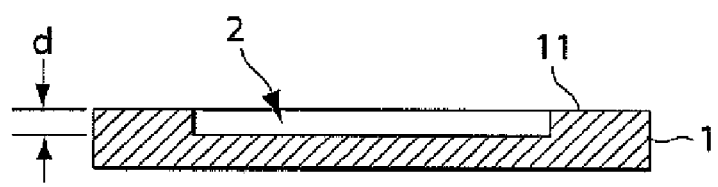
FIG. 2 shows a cross-sectional view along the line A-A in FIG. 1.
Figure 3:
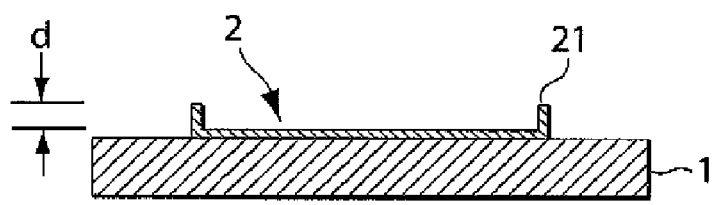
FIG. 3 shows a cross-sectional view along the line A-A in FIG. 1 of an alternate embodiment.

The badge back or body 1 may include a cavity 2 on the body 1 for receiving an RFID device and/or antenna enhancing structure. The cavity 2 may be recessed below a rear surface of the body 1 or may have defining portions that protrude from the rear surface of the body 1. For example, FIG. 2 shows a cross-sectional view along the line A-A in FIG. 1 in an embodiment in which the cavity 2 is recessed below the rear surface 11 of the body 1. This arrangement may be used in "solid back" type badges, in which the cavity 2 may be formed by a die striking, machining or other suitable process. In another embodiment shown in FIG. 3, the cavity 2 may be provided by portions that project from the rear surface 11 of the body 1. Again, the cavity 2 may be formed by any suitable process, such as stamping, casting, machining, etc. In this embodiment, the cavity 2 is formed by a tray 21 or other structure that is attached to the body 1, e.g., by soldering, welding, or other fastening arrangement.

Although the cavity 2 may have any suitable size, shape, etc., in this embodiment, the cavity 2 has top and bottom arcuate portions 22 with rectangular portions 23 at opposite ends. The cavity 2 has a height h of approximately 1.3 inches (in one embodiment about 1.340 inches), a height h1 of approximately 0.8 inches (in one embodiment about 0.815 inches), a width w of approximately 1.6 inches (in one embodiment about 1.647 inches), and a depth d of about 0.4 inches (in one embodiment about 0.45 inches). In the embodiment shown in FIG. 3, the tray 21 or other structure may extend approximately 0.075 inches from the rear surface 11 of the body 1, i.e., the tray 21 may have a bottom wall with a thickness of about 0.03 inches.

Figure 4:
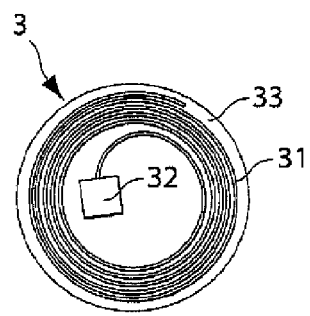
FIG. 4 shows a view of an RFID device in accordance with aspects of the invention.

The cavity 2 in the illustrative embodiments is arranged to suitably receive an RFID device 3, such as that shown in FIG. 4. Although the RFID device 3 may be arranged in any suitable way, in this embodiment, the RFID device 3 includes a coil antenna 31 which has a plurality of metal wire loops arranged to have a diameter of about 1 inch. The coil antenna 31 is attached to a processor 32, which includes suitable circuitry to cause the RFID device 3 to function as desired. The coil antenna 31 and processor 32 are packaged within a pair of opposed plastic disks 33 (e.g., having a diameter of about 1.2 inches) that may be sealed together at their periphery so as to resist exposure of the coil antenna 31 and processor 32 to water, dust, or other materials. The RFID device used in this embodiment is provided by HID Corp. of Irvine, Calif. under part no. H10301.

The RFID device 3 in this embodiment is arranged so that a suitable wireless interrogation signal emitted by an RFID reader may be received by the coil antenna 31 so that the coil antenna 31 generates suitable electrical power from the interrogation signal to power the processor 32. The processor 32 receives power from the coil antenna 31 and in response generates a suitable signal to cause the coil antenna 31 to emit a wireless signal in response to the interrogation signal. As a result, the RFID device 3 may be a "passive" device, e.g., have no battery or other internal power supply, and instead receive power from an outside source. The signal emitted by the coil antenna 31 may include information regarding the identity of the RFID device 3, e.g., a signal that represents an alphanumeric string or other identifier that uniquely identifies the RFID device 3 from other devices. The signal sent by the RFID device 3 may include other or additional information, such as information regarding the badge carrier or issuee. Also, information included in the signal may be encrypted or otherwise protected to help prevent unauthorized detection of sensitive information.

Figure 5:
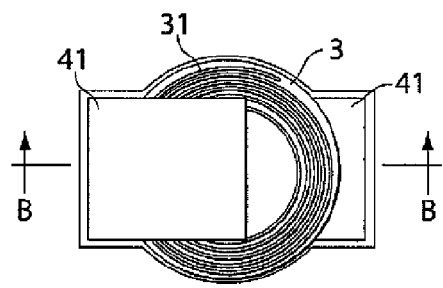
FIG. 5 shows a view of the RFID device of FIG. 4 positioned in a cavity of a badge body along with foil antenna-enhancing structures.
Figure 6:
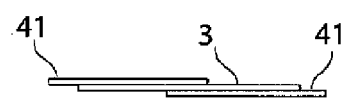
FIG. 6 shows a cross-sectional view along the line B-B in FIG. 5.

The presence of relatively large metal object near an RFID device 3 like that shown in FIG. 4 will generally cause problems in communication between the RFID device 3 and an RFID reader or other interrogator. In this illustrative embodiment, the communication capability of the RFID device 3 is enabled or otherwise enhanced by an antenna-enhancing structure 4 in the form of a pair of amorphous metal foil portions that are adjacent the RFID device 3. It should be understood, however, that the antenna-enhancing structure 4 may have other suitable arrangements. As shown in FIGS. 5 and 6, the foil portions 41 have a rectangular shape and are arranged so that one (lower) foil portion 41 is positioned below the RFID device 3 in the cavity 2 and the other (upper) foil portion 41 is positioned above the RFID device 3. In this embodiment, the foil portions have a width of about 15 mm (about 0.6 inches), a length of about 20 mm (about 0.75 inches) and a thickness of about 0.001 inch. Neither foil portion 41 is in electrical contact with any portion of the RFID device 3, but the foil portions 41 may be in physical contact with the plastic disks 33 that house the coil antenna 31 and processor 32. Also, the lower foil portion 41 may be in contact with the body 1 (or tray 21) in the cavity 2. The foil portions 41 are arranged so that they overlap near the center of the RFID device 3 by about 2-3 mm, e.g., about 15% of the area of the foil sections 41 overlap.

Figure 7:
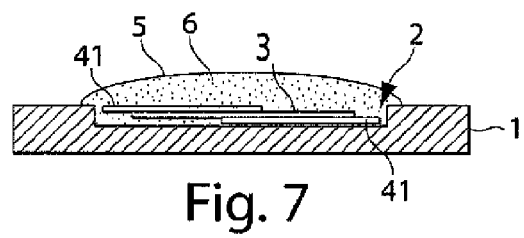
FIG. 7 shows a cross-sectional view of an RFID device and antenna-enhancing structures encapsulated in a plastic material and attached to a badge.

As shown in FIG. 7, for example, the antenna-enhancing structure 4 and the RFID device 3 may be encapsulated, and attached to the body 1, by a plastic material 6, such as an epoxy. Before encapsulation, the foil portions 41 may be adhered, e.g., lightly glued, to the RFID device 3 and the lower foil portion 41 may be adhered, e.g., lightly glued, to the body 1. This may help prevent unwanted movement of the foil portions 41 and/or the RFID device 3 when the epoxy or other material is applied to encapsulate the RFID device 3 and the foil portions 4. The plastic material may serve to not only adhere the RFID device 3 and foil portions 4 to the body 1, but may also serve to protect the parts from foreign materials and/or provide some indication of tampering. In addition, a tamper-evident sticker 5 or other arrangement may be included to provide an indication of an attempt to physically tamper with the RFID device 3. For example, a tamper-evident sticker 5 may include a hologram or other security feature and be adhered over the cavity 2 in such a way that removal or an attempt to remove the sticker 5 causes damage to, or otherwise changes the sticker in a detectable way. In another embodiment, removal of the sticker 5 may leave a tamper-evident residue behind on the body 1.

In the arrangement described above, the RFID device 3 may be capable of communicating with an RFID reader at a distance of about 1 to 10 inches (and possibly more) while attached to the body 1, whereas the RFID device 3 may be capable of communicating at a distance of about 6 to 24 inches when not attached to the body 1 or another metal object. Although this arrangement provides suitable operation, other arrangements for the antenna-enhancing structure are possible. For example, at least a portion of one of the metal foil portions may pass through the coil antenna 31 to enable the RFID tag to communicate with a reader. In this embodiment of the invention, the RFID device operates in a frequency range including 125-135 kHz, but other frequencies may be used. Also, in this embodiment, a standard RFID reader (whether handheld or fixed) may be used to communicate with the RFID device 3, but the RFID device 3 may be arranged to require a specialized reader for communication.

As discussed above, badges configured to include an RFID device 3 may be used at a police precinct or other facility to control access, track the location of personnel, verify the identity of a badge and its carrier, and perform other functions. For example, in one situation a police officer may wish to enter a secure area (e.g., an evidence room or weapons locker) to which the door is locked. In the vicinity of the door may be an RFID reader, which may communicate with the RFID device in the officer's badge to determine the officer's identity.

To read the RFID device, the RFID reader may transmit a radio signal that is received by the RFID device. In response, the RFID device may transmit a representation of an identification number stored in the device's processor. The identification number may be a unique number that may identify the uniform badge and/or the police officer wearing the badge. Once the RFID reader receives the representation of the number, it may send a representation of the number to a database to determine information associated with the number (e.g., the identity of the person wearing the badge and/or whether or not the person is authorized to enter the secure area, etc.). If it is determined that the person is authorized to enter the secure area, the security control system may send a signal to unlock the door. If it is determined that the person is not authorized to enter the secure area, the door may not be unlocked.

In one embodiment, biometric information (e.g., a fingerprint, a photograph, facial analysis or retinal scan information, etc.) may be obtained for the person associated with the badge and its RFID device. In the example above, after communicating with the officer's badge, a security control system may retrieve a photograph of the issuee of the badge or other biometric information. Using the biometric information obtained based on the RFID device identification number, the identity of the badge wearer may be verified. For example, fingerprint information obtained from the officer attempting to access the secure area may be compared with fingerprint information stored in the database for the issuee of the badge. If the comparison shows that the correct person is wearing the badge, access may be granted to the officer. Alternately, a photograph of the issuee of the badge may be retrieved from the database and displayed to a human guard at the security checkpoint. The guard may verify the identity of the badge wearer and allow access, if suitable.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the preceding description and drawings are by way of example only.

The invention claimed is:

1. A badge comprising:
a badge body constructed and arranged to support one or more components of the badge, the badge body including a metal portion;
an RFID device attached to the badge body, the RFID device including a coil antenna and a processor in communication with the coil antenna; and
at least one antenna-enhancing structure attached to the badge body and adjacent the coil antenna, the at least one antenna-enhancing structure enhancing an ability of the RFID device to communicate wirelessly with an RFID reader, the antenna-enhancing structure including a first portion positioned on a first side of the coil antenna such that the coil antenna is located between the first portion and the badge body,
wherein the at least one antenna-enhancing structure includes the first portion and a second portion, the first and second portions each including a metal foil section, and the second portion being positioned between the coil antenna and the badge body such that the first and second portions are positioned on opposite sides of the coil antenna.

2. The badge of claim 1, wherein the at least one antenna-enhancing structure is electrically insulated from the coil antenna.

3. The badge of claim 1, wherein the metal foil sections are electrically insulated from the coil antenna.

4. The badge of claim 3, wherein the RFID device is a passive device.

5. The badge of claim 4, wherein the RFID device receives power for operation via wireless signal that induces an electric potential in the coil antenna.

6. The badge of claim 5, wherein the RFID device transmits a wireless signal including information regarding an identity of the RFID device.

7. The badge of claim 3, wherein the coil antenna includes a plurality of metal wire loops having a diameter of approximately 1 inch and the foil sections each have a length of about 0.75 inch and a width of about 0.6 inch.

8. The badge of claim 7, wherein the metal foil sections are arranged so that the metal foil sections partially overlap.

9. The badge of claim 8, wherein about 15% of the metal foil sections overlap with each other.

10. The badge of claim 1, wherein a cavity is provided on the badge body to receive the RFID device and the at least one antenna-enhancing structure.

11. The badge of claim 10, wherein the cavity has a length of about 1.6 inches, a width of about 0.8 inches, and a depth of about 0.05 inches.

12. The badge of claim 11, wherein the RFID device and the at least one antenna-enhancing structure are encapsulated and attached to the badge body by a plastic material.

13. The badge of claim 12, wherein the plastic material is an epoxy.

14. The badge of claim 1, wherein the badge body is formed entirely of a metal material.

15. The badge of claim 1, further comprising a tamper-evident material arranged to indicate an attempt to physically tamper with the RFID device.

16. The badge of claim 1, wherein the one or more components includes a visible indication of an organization with which a wearer of the badge is associated and/or an identifier for the wearer of the badge.

* * * * *